Jan. 26, 1960
R. K. SHEDD
2,922,634
FLUID ACTUATED SUSPENSION CONTROL SYSTEM
Filed Dec. 20, 1956
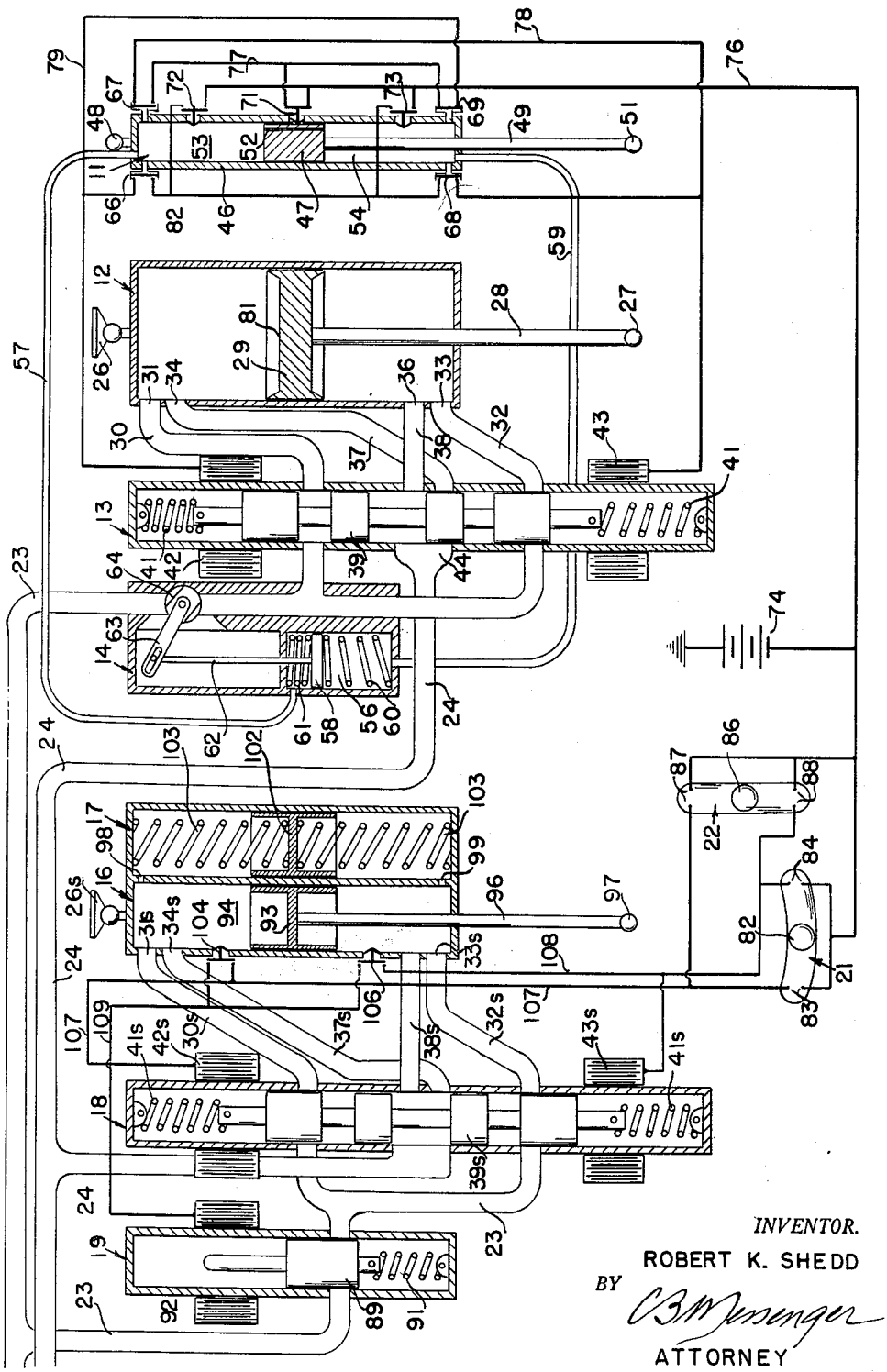
INVENTOR.
ROBERT K. SHEDD
BY
CBMJessenger
ATTORNEY United States Patent Office 2,922,634
Patented Jan. 26, 1960

2,922,634
FLUID ACTUATED SUSPENSION CONTROL SYSTEM

Robert K. Shedd, Denver, Colo.

Application December 20, 1956, Serial No. 629,575

8 Claims. (Cl. 267—11)

The present invention relates to a suspension system for automotive vehicles, and, more particularly, to a fluid actuated suspension control system.

Previously, many different types of suspension systems have been developed for automotive use. Among such systems there has been considerable development in recent years of various types of hydraulic or air suspension control systems.

An object of the present invention is to provide an improved type of suspension control system in which either liquid or gaseous fluids may be used. In addition to the adaptability of the invention to various fluids, it is an object of this invention to provide a system which will apply fluid under pressure to the task of regulating and positioning wheel suspension members in such manner as to eliminate or reduce vertical movements of the car body or sprung weight of the vehicle in relation to undulations or bumps in road surfaces.

Another object of the present invention is to eliminate or reduce the tendency of a vehicle to sway or lean outwardly when rounding curves and turns.

A still further object of this invention is to provide a system that will eliminate or reduce the tendency of vehicles to dip and pitch or otherwise deviate radically from normal level fore and aft position when accelerating or braking the vehicle.

Further objects and advantages of the present invention will be apparent from the appended description and drawing, in which The figure is a schematic diagram in partial cross-section showing the inter working arrangement of the elements of one embodiment of this invention.

Briefly stated, the present invention provides an automotive suspension system in which a fluid medium, such as, hydraulic fluid under pressure or compressed air, is used as a source of corrective power that may be selectively introduced into actuating and stabilizing cylinders to eliminate or correct the transmission of the usually encountered road shocks and the effects of acceleration and deceleration forces acting on the vehicle. Primary corrective control is derived through use of pressure changes and piston position changes in a conventional type shock absorber as regulating mediums for governing the introduction of the corrective power fluid into an actuating cylinder which is positioned between the vehicle body or sprung weight of the vehicle and the springs or wheels of the vehicle. A secondary control system for minimizing the effects of inertia and acceleration forces acting on the vehicle is provided through use of additional control members adapted to selectively actuate a stabilizer unit.

Referring now to the drawing, the detailed features of an embodiment of the invention may be more fully explained and understood. In the drawing it will be noted that the mechanism utilized to satisfy the objectives of this invention is roughly divided into two major portions, of which the first portion represents a primary control system which includes a shock absorber element 11, a main actuating cylinder 12, an actuator cylinder selector valve 13 and an air regulator valve 14. The secondary, or stabilizer, system includes the elements of a combined stabilizer cylinder 16 and dashpot type expansion chamber 17, a stabilizer selector valve 18 and a stabilizer air regulator valve 19. Also illustrated in the drawing are additional mechanisms and circuits for energizing and regulating the vehicle stabilizing system to provide a level ride. In the system shown, mercury switches are used. Of these, the lateral mercury switch 21 governs actuation of the stabilizer system when lateral tilting of the vehicle is encountered and in which the longitudinal mercury switch 22 governs actuation of the stabilizer system when fore and aft tilting of the vehicle is encountered.

The inter working of these elements to provide stabilized, jar-free and controlled riding comfort for an automotive vehicle when the system is interconnected with the electrical power system of the vehicle and when interconnected with a source of hydraulic fluid under pressure or of compressed air will best be described through separate discussion of the primary and secondary systems before a general discussion of combined functions of such systems as actually installed on a vehicle.

Though the invention is adaptable to use with various fluid power mediums, the present embodiment of the invention is especially adapted for use with compressed air. Accordingly, the description will be made with relation to use of compressed air, and it is to be understood that air under pressure is conveyed from a compressor or other source (not shown) by the conduits of inlet system 23, and further that the conduits of return system 24 carry return air back to the compressor when the preferred closed type compressed air system is utilized.

*Primary system*

In the primary system the shock absorber 11, actuator cylinder selector valve 13 and air regulator valve 14 are all utilized to govern the introduction and exhaust of air under pressure into and out of the actuating cylinder 12. Since this actuating cylinder 12 is connected at one end to an anchor piece 26 attached to the frame of the vehicle and since the end 27 of the piston rod 28 is preferably connected to the wheel portion of the vehicle or to the spring system attached to the wheel, any movement of the piston 29 within the cylinder 12 will tend to increase or decrease the distance between the vehicle frame and the wheels of the vehicle. Further, since air inlet and outlet ports are provided in the cylinder 12, air may be introduced into and exhausted out of the cylinder 12 to cause movements of the piston 29 when it is desired or desirable to change the effective distance between the vehicle wheels and frame, or when it is desirable to increase or decrease the support or shock force between any particular wheel and the frame. For this purpose an air supply conduit 30 is connected to upper inlet 31, and an air supply conduit 32 is connected to lower inlet 33. Likewise, the upper exhaust 34 and lower exhaust 36 are respectively connected to exhaust conduits 37 and 38. These conduits, as shown, are connected to the actuating cylinder selector valve 13 in such manner and in such positions as necessary to secure selective introduction of air from the inlet system 23 into conduits 30 and 32, and further in such manner that air being exhausted from the actuating cylinder 12 through the conduits 37 and 38 is conducted to the return system 24.

The flow of air through the selector valve 13 and into the desired conduits is regulated by the slide valve 39 reciprocally received in the body of the selector valve 13, Springs 41 are provided at each end of the selector valve 13 and connected to the slide valve 39 in such manner as to ordinarily hold the slide valve 39 in neutral position in which both exhaust ports 34 and 36 and conduits 37 and 38 are connected directly through the selector valve 13 to the exhaust outlet 44 in return system 24. This neutral positioning of slide valve 39 is similar to the positioning of slide valve 39s, as shown for stabilizer selector valve 18.

In order to move slide valve 39 away from its neutral position, solenoid actuator cores 42 and 43 are used. These solenoid cores are placed respectively at the top and at the bottom of the selector valve 13 in such manner that when the core is energized, the slide valve 39 will be moved against the spring pressures exerted by the springs 41 to alternate valving positions. In the illustration of actuator cylinder selector valve 13, it is presumed that the solenoid core 42 is energized, and accordingly slide valve 39 is moved upwardly so that inlet port 31 and conduit 30 are connected directly through selector valve 13 to the incoming compressed air inlet system 23. At the same time the compressed air is being introduced through the conduit 30 into the actuating cylinder 12, it should be noted that the slide valve 39 is positioned so that air below the piston 29 may be exhausted out of the outlet port 36 and outlet conduit 38. Passage of air through the other conduits 37 and 32 is blocked off by the slide valve 39. If solenoid core 43 is energized, the positioning of slide valve 39 would, of course, be reversed to open inlet port 33 and outlet port 34, while closing off inlet port 31 and outlet port 36. Means for controlling the energization of solenoid cores 42 and 43 as well as means for varying the quantity of air introduced through inlet system 23 is provided by switches and mechanisms associated with shock absorber 11.

It will be recognized that in the operation of a shock absorber increases and decreases in the pressure of the hydraulic fluid on opposite sides of the operative piston will occur. These pressure fluctuations will in general be coincident with movement of the piston within the shock absorber, and necessarily, due to the construction of the ordinary type shock absorber, the pressure fluctuations noted within the shock absorber are dependent upon the rapidity of movement of the piston with respect to the body of the shock absorber. When installed on a vehicle, a rapid pressure increase on one side of the piston will be noted when the wheels of the vehicle strike a bump in the road or fall into a depression or chuck hole. Undulations in the road surface will cause only minor pressure fluctuations within the shock absorber.

The shock absorber 11 utilized in this embodiment of the invention is of conventional type and, accordingly, is provided with a cylinder body 46 in which a piston 47 is mounted for reciprocal movement inwardly and outwardly in the body 46 toward and away from an anchored end 48 of the shock absorber, which is preferably secured to the frame of the vehicle. A piston rod 49 is connected to the piston 47 and extends out of the opposite end of the shock absorber 11, so that end 51 may be secured to the wheel support system of the vehicle. With this arrangement, any change in the relative distance between the wheel supports of the vehicle and the vehicle body will cause the piston 47 to move reciprocally within shock absorber body 46 against the hydraulic fluid received in the body 46 and against the resistance offered by the restriction of flow from one side of the piston to the opposite side of the piston through the metering orifice 52 in piston 47. As in all proper shock absorber design, the restriction within the metering orifice 52 is designed, so that gradual movements of the piston 47 with respect to the body 46 may be made without substantial increase in the hydraulic fluid pressure within the shock absorber. However, when a bump in the road is engaged by the wheel system of the vehicle, the piston rod 49 will be rapidly moved inwardly with respect to the shock absorber thereby causing an increase in the hydraulic fluid pressure in the space 53 above the piston 47 and a corresponding decrease in the fluid pressure in the space 54 below the piston 47. Rapid movement of the shock absorber push rod 49 and piston 47 in the opposite direction due to the falling of the wheel suspension system into a chuck hole or the like will, of course, cause a reverse pressure build-up within the shock absorber 11.

These fluctuations or changes in the hydraulic fluid pressure within the shock absorber 11 are used as a first control medium to regulate both the quantity of air introduced into the actuator cylinder 12 and further to determine on which side of the actuator piston 29 such air under pressure shall be introduced. The first, or quantity control, function of the system is obtained through use of a hydraulic circuit which interconnects opposite sides of the shock absorber to opposite sides of an air control valve cylinder 56. As shown in the drawings, a first conduit 57 interconnects the space 53 above piston 47 in shock absorber 11 with a portion of the air control valve cylinder 56 above the air control valve piston 58. In similar manner, conduit 59 interconnects the space 54 in the lower portion of shock absorber 11 with a part of cylinder 56 below the air control valve piston 58.

As will be noted from the drawings, movement of the piston 58 is opposed by springs 60 and 61 which normally tend to hold the piston in centered position; however, the springs 60 and 61 are preferably of such strength that the spring resistance may be overcome whenever there is a significant increase in the hydraulic pressure on either side of the piston 58. When properly designed, the spring pressures are balanced with respect to possible impressed hydraulic pressures, so that maximum movement of the piston 58 and of push rod 62 is only encountered when maximum pressure increase is noted within shock absorber 11. This balancing of spring pressures and hydraulic pressures is used within the air control valve 14 by connecting push rod 62 to a lever arm 63 on air control valve 64 in such manner that valve 64 will be rotated to alternate positions in accordance with movements of push rod 62 and piston 58. When properly designed, the valve 64 will pass a minimum amount of air under pressure through the inlet system 23 when the piston 58 is in the neutral position, whereas a maximum amount of air will be passed by the valve 64 whenever the piston 58 is in full extended up-position or in the full extended down-position. With this arrangement, an increased flow of air under pressure will be delivered to selector valve 13 for proper distribution to actuator cylinder 12 whenever shock absorber 11 is being subjected to rapid position changes. Conversely, if relative movement of the car body with respect to the wheel suspension is gentle or slow, the air control valve 64 will be held in a near neutral position thereby decreasing the quantity of air introduced to the actuator cylinder 12. This system for changing the amount of corrective fluid power introduced into a suspension system in accordance with fluctuations of hydraulic pressure within the shock absorber unit represents a first major feature of the present invention.

A second feature of this invention utilizes these same pressure changes within a hydraulic shock absorber to control the positioning of the selector valve to thereby determine the direction in which corrective power shall be applied against the vehicle body and wheel suspension system to provide better riding characteristics. This desirable function is obtained through use of an electrical system interconnected with pressure-sensitive diaphragm type switches mounted on opposite ends of the shock absorber 11. These diaphragm type switches are either mounted directly on the shock absorber as shown or connected thereto so that one side of a diaphragm unit is subjected to the same hydraulic pressures as those existing within the shock absorber 11 at their respective points of connection. When properly designed, an increase in hydraulic pressure within the shock absorber 11 will cause movement of the diaphragm, thereby closing the contact points of an electrical circuit connected to the unit.

In the embodiment shown, the necessary diaphragm switches are connected to the shock absorber at each end of the shock absorber. For convenience of description, the switches are numbered respectively 66 and 67 at the anchored end 48 of the shock absorber 11 and 68 and 69 at the free end of the shock absorber 11. In addition to the diaphragm switches 66 through 69, a plurality of mechanical switches will also be used in conjunction with operation of the shock absorber 11. While ordinarily these mechanical switches would be positioned on or adjacent the piston rod 49, the switches are here shown positioned directly on shock absorber 11 to better illustrate the cooperative positioning of such switches with respect to movements of the piston 47.

As shown, a first mechanical switch 71 is positioned so that the switch will be closed when the piston 47 is in its neutral or at-rest position. A second switch 72 is positioned in the upper portion of the shock absorber so that this switch 72 will be closed whenever the piston 47 has been moved by a heavy shock-loading into a telescoped position within the shock absorber body 46. This switch 72 will be closed when the associated wheel system has been subjected to a violent bump of such magnitude as will probably cause direct contact between the vehicle body and the wheel system, or at least between rigid type shock elements, such as, rubber pads, on the body or wheel system.

A third switch 73 is correspondingly positioned adjacent the free end of the shock absorber, so that the circuit through the switch 73 will only be closed on occasions when it is likely that the vehicle body and wheel suspension system will be moved apart from each other a sufficient distance to cause the spring system for the vehicle to exert a relatively violent force tending to move the car body or sprung weight of the vehicle and the wheel suspension system back toward their normal positions.

With this arrangement of diaphragm switches and mechanical switches and with the switch elements interconnected with the solenoid cores 42 and 43 by the electrical circuit as shown, it is possible to provide correction for both normal influences, in which the vehicle is subjected to ordinary road shocks which are transmitted from the wheels to the frame, but also to provide correction for reverse influences in which the forces of inerita, momentum, gravity, acceleration and deceleration act on the car body or sprung weight of the vehicle and are transmitted from the sprung weight of the vehicle to the wheel suspension system.

During normal operation of the system, it is presumed that the piston 47 will be in a neutral or near-neutral position within the shock absorber, so that at all times the mechanical switch 71 will be closed. When this switch is closed, electrical power from the battery 74 is conducted by power circuit 76 through the switch 71 to buss 77 and to one side of the contact points within diaphragm switches 67 and 69. Now then, if a bump in the road is encountered by the wheel system of the vehicle, an upward force will be exerted through the piston rod 49 to piston 47 tending to move the piston 47 inwardly with respect to the shock absorber 11. This will cause an increase in the hydraulic pressure within the chamber 53 and against the diaphragm of diaphragm switch 67. If the pressure is of sufficient force, the contact points of switch 67 will be closed, and electricity will be conducted through the line 78 to the solenoid 43. When the solenoid core 43 is energized, slide valve 39 will be moved downwardly within the selector valve 13.

Under opposite conditions as would be encountered when the wheel system of the vehicle drops into a hole in the road, there will be an increase in hydraulic pressure within the chamber 54 and acting against the diaphragm of diaphragm switch 69. When this condition prevails, power from the buss 77 will be transmitted through the switch 69 and through line 79 to solenoid core 42. This will cause the slide valve 39 to be moved upwardly in the selector valve 13 to the position as shown in the drawings. When the selector valve is moved into this illustrated position, incoming compressed air in the inlet system 23 will be introduced through conduits 30 and inlet port 31 into the top side of the actuator cylinder 12 thereby increasing the pressure acting against the top surface 81 of actuator piston 29. This will cause the piston rod 28 to be moved outwardly with respect to the actuator cylinder 12 tending to maintain a constant car body support force exerted upwardly against the car frame at the anchor points, thereby preventing the car body from following the wheel system downwardly into the chuck hole. In this illustration, compressed air has been introduced to effectively prevent transmission of a road shock due to a change in road contour to the car body. It will further be seen that if a bump in the road is encountered, compressed air will in similar manner be introduced on the opposite side of the piston 29 to make similar compensation and prevent transmission of the road shock to the car body. Accordingly, this system will provide a smooth, jar-free and undisturbed ride when the car is passing over an ordinary imperfect road surface.

Analysis of the system so far described will reveal, however, that under conditions when disturbing forces are being exerted against the car body instead of against the wheel system, the system operates in such manner as to accentuate and increase the effect of such disturbing forces. Since forces of this nature are encountered during many normal driving operations, such as, during acceleration or stopping, or when rounding a curve, it is obvious that additional means must be provided to prevent rather than aid the effects of dipping, pitching or yawing of the car body. If the shock absorber 11, actuator cylinder 12, selector valve 13 and air control valve 14 of the described system are considered as being used on the front suspension system of a vehicle, the arrangement for preventing the dipping of the automobile when the brakes are applied may be easily explained. Under this normal dipping condition, the front shock absorbers will be subjected to a considerable telescoping force which will cause the piston 47 to be moved away from its neutral position and which, if objectionable, will be of sufficient magnitude to cause the piston 47 to be moved upwardly in the shock absorber body 46 until the piston 47 contacts the reversing switch 72. When switch 72 is closed, power introduced through line 76 will pass through the switch 72 to buss 82. Further, since movement of the piston 47 in the prescribed direction will cause an increment of pressure in the space 53, diaphragm switch 66 will be closed. When this switch is closed, the transmitted power will be conducted to the line 79, and by such line to the solenoid core 42. Energization of the core 42 will, as previously described, move the slide valve 39 to the position illustrated, and air under pressure from the inlet system 23 will be introduced into the actuator cylinder 12 to act against the top surface 81 of piston 29. The introduction of air under pressure through the inlet port 31 will cause extension of piston rod 28, to hold the front end of the car body upwardly and away from the front wheel suspension system of the car, thereby effectively preventing dipping of the car upon braking.

Any tendency of the front of the car to move upwardly or pitch during acceleration will be compensated through closure of switch 73, diaphragm switch 68 and energization of solenoid core 43 to introduce air under pressure on the opposite side of actuator cylinder piston 29. In similar manner, any tendency to dip on the outboard front of the car or pitch on the inboard rear of the car when the car is rounding a curve will likewise be compensated through proper energization of the prescribed solenoid cores.

In an actual operative installation, it is contemplated that it might be desirable to include some type of time delay mechanism in the circuits interconnected with mechanical switches 71, 72 and 73. The purpose of these switches would be to delay transmission of electrical energy through the circuits a short interval after initial closure of the switch and to leave the circuit energized a short interval after the piston had moved out of contact with the switches. With the time lag properly adjusted the counteractive force introduced into the actuator cylinder could be exerted throughout the cycle of movement of the vehicle components caused by engagement with an obstacle in the road, and the system would return to normal operation only after the shock movements were dampened to such an extent that the shock absorber piston 47 remained in its center position out of contact with the mechanical switches 72 and 73.

*Secondary or stabilizer system*

To further counteract the tendency of the vehicle to sway when rounding curves and turns and to minimize the effects of dipping and pitching coincident with acceleration and deceleration of the vehicle, a stabilizer system has been devised which in part utilizes mechanisms similar to those previously described.

Since the main function of the stabilizer system is to counteract acceleration forces acting on the vehicle, the control medium which governs activation of the stabilizer system must necessarily be sensitive to such acceleration forces. While gyro-operated devices and pendulum mechanisms and the like would satisfactorily serve the purpose, the present embodiment of the invention uses mercury switches so designed and positioned on the vehicle as to close selected circuits when the vehicle is subjected to positive or negative acceleration forces in various directions.

In the drawings, mercury switch 21 schematically represents a type of acceleration sensitive device which could be mounted on a transverse frame member of the vehicle, so that whenever the vehicle is subjected to transverse acceleration forces, the ball of mercury 82 within mercury switch 21 would be moved selectively outwardly toward the ends of the tube container to close the electrical circuit through either the contacts 83 or 84. In similar manner, the mercury 86 within mercury switch 22 is free to move within the switch to selectively close off either the front contacts 87 or rear contacts 88. As shown in the illustration of switch 21, the tubes which contain the mercury will be curved upwardly at the ends. This upward curvature, when properly designed, will prevent closing of the contact points unless the forces acting on the vehicle reach a predetermined magnitude. In the design of the mercury switch 22, the curvature must further be regulated by the fact that it would be undesirable to energize the circuit through the switch on occasions when the vehicle is merely going up or down the usually encountered road grades.

As here illustrated in the drawings, the mercury switches 21 and 22 are shown interconnected with a left front stabilizer system which includes stabilizer cylinder 17, stabilizer selector valve 18 and stabilizer air regulator valve 19. Structurally, these units themselves are made up of various elements which should be here described. First, air control regulator valve is positioned in the air inlet system 23, so that slide valve 89 in the regulator is normally held by spring 91 in a position which closes off the passage of air through the inlet system 23. The solenoid core 92 is provided, however, so that when the solenoid core 92 is energized, the slide valve 89 will be moved upwardly in regulator valve 19 to pass a full quantity of compressed air directly through the air regulator valve.

As previously stated, the stabilizer selector valve 18 is of identical structure with actuator cylinder selector valve 13. Accordingly, corresponding parts of this unit have been numbered similarly to those shown and described in conjunction with valve 13. Likewise, the conduits interconnecting the stabilizer selector valve 18 with stabilizer 16 have been correspondingly numbered. Stabilizer cylinder 16 itself has a piston 93 received in the central bore 94 of cylinder 16 for reciprocal movement inwardly and outwardly with respect to cylinder 16. This piston 93 is joined to a connecting rod 96 which extends out of the cylinder 16, so that its free end 97 may be connected to the wheel portion of the vehicle or the spring system of the vehicle attached to the wheel. Similar to the mounting of actuating cylinder 12, one end of the stabilizer cylinder 16 is connected to an anchor piece 26s, which is attached to the frame of the vehicle. Stabilizer cylinder 16 is provided with inlet and outlet ports which are here numbered correspondingly to inlet and outlet ports of actuator cylinder 12. Besides these inlet and outlet ports, however, the walls of stabilizer cylinder 16 are provided with additional openings 98 and 99 which intercommunicate the interior of the stabilizer cylinder with the interior of dashpot unit 17. Since dashpot 17 has a free piston 102, which is normally held in centered position within dashpot 17 by springs 103, piston 102 will only be moved within the dashpot when the pressure of air introduced through one of the openings 98 or 99 is greater than the air pressure on the opposite side of piston 102. Such changes in air pressure will be encountered within the dashpot 17 and within stabilizer cylinder 16 whenever selector valve 18 opens to introduce compressed air under pressure into one side of stabilizer cylinder 16 or whenever road shocks or other forces cause relative movement between stabilizer cylinder 16 and piston 93. Actually, the tension of these dashpot springs is of sufficient strength that they would not be compressed to their limits by the maximum injection pressure, thus leaving a margin of compressibility for the absorption of road shocks encountered during the operation of the stabilizer unit. The flexibility of the positioning of the dashpot piston 102, in combination with the compressible characteristics of the air itself, would overcome the tendency this stabilizer unit would otherwise have of unduly "stiffening" the automobile springing action during its operation.

The specific means for controlling the energization of stabilizer selector valve 18 includes the use of two mechanical switches which are similar to the mechanical switches 71—73 previously described. The present switches are positioned in the stabilizer cylinder so that the top switch 104 is activated whenever piston 93 moves inwardly with respect to stabilizer cylinder 16 a short distance away from its central or neutral position. Bottom switch 106 is correspondingly positioned so that it will be closed whenever the piston 93 moves outwardly a short distance from its neutral position. These switches are interconnected to mercury switches 21 and 22 by power lines 107 and 108 and additional circuit connections, as shown.

When connected in the manner illustrated with the described stabilizer unit applied to the left front suspension of the vehicle, the system will operate as follows: When the vehicle is making a right turn, the mercury ball 82 within switch 21 will be moved outwardly to close the circuit through contacts 83. Power will then pass through line 107 to the top switch 104 and to solenoid 42s of selector valve 18. Since the car body has a tendency to lean toward the outside of a turn, the distance between anchor piece 26s and free end 97 of connecting rod 96 will tend to be reduced, thereby telescoping connecting rod 96 within stabilizer cylinder 16 and moving the piston 93 into contact with switch 104. When switch 104 is closed, power will be transmitted through circuit 109 to energize solenoid core 92 of air regulator valve 19. With both solenoid cores 92 and 42s being energized, compressed air from inlet system 23 will pass through air regulator valve 19, through selector valve 18 and conduit 30s to inlet port 31s of stabilizer cylinder 16. The compressed air so introduced will move piston 93 within cylinder 16 back toward its neutral position until switch 104 is allowed to again open. Since switches 104 and 106 are positioned operatively close to the neutral position of piston 93, this described function of the stabilizer system will obviously tend to hold the piston 93 and, therefore, the entire car body in their respective neutral or level riding positions.

With this same system, if the car is executing a left turn, contacts 84 will be closed so that when piston 93 closes switch 106, solenoid cores 92 and 41s will be energized to introduce compressed air under pressure on the opposite side of piston 93 to again hold the car in level riding position.

Besides the elimination of swaying of the vehicle, the present stabilizer system also is functional to prevent dipping and pitching of the vehicle under the effects of positive and negative fore and aft acceleration forces. An illustration of this function would be the action of this described front stabilizer unit when the car is braked. Under such conditions, the deceleration forces will tend to move the mercury ball 86 within mercury switch 22 forwardly to close contacts 87. When these contacts are closed, power in line 107 will energize solenoid core 42s, and if the nose of the car tends to move downwardly with respect to the frame, switch 104 will be closed to energize solenoid core 92s and air regulator valve 19. As previously explained, this combination will cause the introduction of compressed air through inlet port 31s to move piston 93 toward its neutral position and tending to raise or hold the nose of the vehicle in raised position with respect to the frame of the vehicle. The shock which normally would be transmitted to the vehicle when this natural tendency to dip is prevented through action of the stabilizer cylinder 16 will, of course, in large measure be absorbed through action of the dashpot unit 17. Pitching of the front end of the car under conditions of fast acceleration will be minimized by closure of contacts 88 and subsequent energization of solenoid cores 41s and 92.

On the usual automotive installation, stabilizer units of this type would probably be installed on both the front and rear suspension systems of the vehicle. For a rear suspension system, the connections for contacts 87 and 88 would, of course, be reversed to provide cooperative vehicle stabilization.

With the described primary system and stabilizer system coupled together on an automotive installation, a smooth, undisturbed, shock and sway-free ride would be possible for passengers in the vehicle. In general, the ease and comfort afforded by the system would be unaffected by different loadings of the vehicle, since the operation of the several mechanical switches employed is governed by the position of the pistons which operate them, and any change in position due to an increase in load would provide to a certain extent, desirable adjustments in the operation of the system.

While the elements and functions of the system have been described with reference to a schematic drawing of such elements, it is obvious that the exact structure of such elements would be considerably modified in an actual system installed on a vehicle. Conceivably, the entire primary and stabilizer functions of the system could be carried out by a single compact unit in which the various elements of the invention here described would be arranged coaxially one within the other. Likewise the use of bellows or other similar type expansive chamber actuators is contemplated in place of the cylinders and pistons here described. Further modifications and changes of the present invention will be apparent to those skilled in the art. All such modifications and changes as come within the scope of the hereunto appended claims are deemed to be a part of this invention.

What is claimed is:

1. A suspension system for vehicles which comprises a source of fluid under pressure greater than atmospheric, an expansion actuator device on said vehicle interconnected to said source for the introduction of pressurized fluid into said actuator, an anchor end of said actuator and a movable end of said actuator connected to said vehicle in such manner that movement of said actuator will increase and decrease the distance between the wheels and frame of said vehicle, a cylinder and piston fluid type shock absorber unit on said vehicle operatively mounted between the wheels and frame of said vehicle in such manner that shock loads between the wheels and frame of said vehicle cause relative movement between said shock absorber cylinder and piston and consequent increase in fluid pressure within said shock absorber at the end of said shock absorber cylinder toward which the shock absorber piston is moving, a volumetic fluid flow regulator member intermediate the source of said pressurized fluid and said actuator, and means connected to said shock absorber and flow sensitive to pressure increments within said shock absorber for controlling the positioning of said regulator member and thereby regulating the quantity flow of compressed fluid through said valve member and into said actuator.

2. A suspension system for vehicles which comprises a source of fluid under pressure greater than atmospheric, an expansion actuator device on said vehicle interconnected to said source for the introduction of pressurized fluid into said actuator, an anchor end of said actuator and a movable end of said actuator connected to said vehicle in such manner that movement of said actuator will increase and decrease the distance between the wheels and frame of said vehicle, a cylinder and piston fluid type shock absorber unit on said vehicle operatively mounted between the wheels and frame of said vehicle in such manner that shock loads between the wheels and frame of said vehicle cause relative movement between said shock absorber cylinder and piston and consequent increase in fluid pressure within said shock absorber at the end of said shock absorber cylinder toward which the shock absorber piston is moving, an actuator selector valve intermediate said source of pressurized fluid and said actuator for directing the pressurized fluid into and out of said actuator to increase and decrease the distance between the wheels and frame of said vehicle, and means connected to said shock absorber sensitive to pressure increments within said shock absorber for controlling the flow directing positioning of said actuator selector valve.

3. A suspension system for vehicles which comprises a source of fluid under pressure greater than atmospheric, an expansion actuator device on said vehicle interconnected to said source for the introduction of pressurized fluid into said actuator, an anchor end of said actuator and movable end of said actuator connected to said vehicle in such manner that movement of said actuator will increase and decrease the distance between the wheels and frame of said vehicle, a cylinder and piston fluid type shock absorber unit on said vehicle operatively mounted between the wheels and frame of said vehicle in such manner that shock loads between the wheels and frame of said vehicle cause relative movement between said shock absorber cylinder and piston and consequent increase in fluid pressure within said shock absorber at the end of said shock absorber cylinder toward which the shock absorber piston is moving, a volumetic fluid flow regulator member intermediate the source of said pressurized fluid and said actuator, means connected to said shock absorber and flow regulator sensitive to pressure increments within said shock absorber for controlling the positioning of said regulator member and thereby regulating the quantity flow of compressed fluid through said valve member and into said actuator, an actuator selector valve intermediate said source of pressurized fluid and said actuator for directing the pressurized fluid into and out of said actuator to increase and decrease the distance between the wheels and frame of said vehicle, and means connected to said shock absorber sensitive to pressure increments within said shock absorber for controlling the flow directing positioning of said actuator selector valve.

4. A suspension system for vehicles which comprises a source of fluid under pressure greater than atmospheric, an expansion actuator device on said vehicle interconnected to said source for the introduction of pressurized fluid into said actuator, an anchor end of said actuator and movable end of said actuator connected to said vehicle in such manner that movement of said actuator will increase and decrease the distance between the wheels and frame of said vehicle, a cylinder and piston fluid type shock absorber unit on said vehicle operatively mounted between the wheels and frame of said vehicle in such manner that shock loads between the wheels and frame of said vehicle cause relative movement between said shock absorber cylinder and piston and consequent increase in fluid pressure within said shock absorber at the end of said shock absorber cylinder toward which the shock absorber piston is moving, a volumetric fluid flow regulator member intermediate the source of said pressurized fluid and said actuator, means connected to said shock absorber and flow regulator sensitive to pressure increments within said shock absorber for controlling the positioning of said regulator member and thereby regulating the quantity flow of compressed fluid through said valve member and into said actuator, an actuator selector valve intermediate said source of pressurized fluid and said actuator for directing the pressurized fluid into and out of said actuator to increase and decrease the distance between the wheels and frame of said vehicle, and pressure sensitive switches connected to said shock absorber and interconnected with said actuator selector valve for controlling the flow directing positioning of said actuator selector valve in accordance with pressure increments within said shock absorber.

5. A suspension system for vehicles which comprises a source of fluid under pressure greater than atmospheric, an expansion actuator device on said vehicle interconnected to said source for the introduction of pressurized fluid into said actuator, an anchor end of said actuator and movable end of said actuator connected to said vehicle in such manner that movement of said actuator will increase and decrease the distance between the wheels and frame of said vehicle, a cylinder and piston fluid type shock absorber unit on said vehicle operatively mounted between the wheels and frame of said vehicle in such manner that shock loads between the wheels and frame of said vehicle cause relative movement between said shock absorber cylinder and piston and consequent increase in fluid pressure within said shock absorber at the end of said shock absorber cylinder toward which the shock absorber piston is moving, a volumetic fluid flow regulator member intermediate the source of said pressurized fluid and said actuator, means connected to said shock absorber and flow regulator sensitive to pressure increments within said shock absorber for controlling the positioning of said regulator member and thereby regulating the quantity flow of compressed fluid through said valve member and into said actuator, an actuator selector valve intermediate said source of pressurized fluid and said actuator for directing the pressurized fluid into and out of said actuator to increase and decrease the distance between the wheels and frame of said vehicle, mechanical switches operatively positioned for selective actuation in accordance with relative movements of said shock absorber cylinder and piston, and means interconnecting said switches and said actuator selector valve for controlling the flow directing positioning of said selector valve in accordance with relative movements of said shock absorber cylinder and piston.

6. A suspension system for vehicles which comprises a source of fluid under pressure greater than atmospheric, an expansion actuator device on said vehicle interconnected to said source for the introduction of pressurized fluid into said actuator, an anchor end of said actuator and movable end of said actuator connected to said vehicle in such manner that movement of said actuator will increase and decrease the distance between the wheels and frame of said vehicle, a cylinder and piston fluid type shock absorber unit on said vehicle operatively mounted between the wheels and frame of said vehicle in such manner that shock loads between the wheels and frame of said vehicle cause relative movement between said shock absorber cylinder and piston and consequent increase in fluid pressure within said shock absorber at the end of said shock absorber cylinder toward which the shock absorber piston is moving, a volumetic fluid flow regulator member intermediate the source of said pressurized fluid and said actuator, means connected to said shock absorber and flow regulator sensitive to pressure increments within said shock absorber for controlling the positioning of said regulator member and thereby regulating the quantity flow of compressed fluid through said valve member and into said actuator, an actuator selector valve intermediate said source of pressurized fluid and said actuator for directing the pressurized fluid into and out of said actuator to increase and decrease the distance between the wheels and frame of said vehicle, an electrical circuit, pressure sensitive switches in said circuit connected to said shock absorber and interconnected with said actuator selector valve for controlling the flow directing positioning of said actuator valve in accordance with pressure increments within said shock absorber, mechanical switches in said circuit operatively positioned for selective actuation in accordance with relative movements of said shock absorber cylinder and piston, and means cooperatively interconnecting said pressure sensitive and mechanical switches for reversing the normal pressure sensitive switch selected flow directing positioning of said actuator selector valve when the circuit through selective mechanical switches is energized.

7. A suspension system for vehicles which comprises a source of fluid under pressure greater than atmospheric, an actuator cylinder mounted on said vehicle interconnected to said source for the introduction of pressurized fluid into said cylinder, a piston within said cylinder and likewise connected to said vehicle in such manner that movement of said piston within said cylinder will increase and decrease the distance between the wheels and frame of said vehicle, a cylinder and piston fluid type shock absorber unit on said vehicle operatively mounted between the wheels and frame of said vehicle in such manner that shock loads between the wheels and frame of said vehicle cause relative movement between said shock absorber cylinder and piston and consequent increase in fluid pressure within said shock absorber at the end of said shock absorber cylinder toward which the shock absorber piston is moving, a quantity fluid flow regulating member intermediate the source of said pressurized fluid and said actuator cylinder, and means connected to said shock absorber and flow regulator sensitive to pressure increments within said shock absorber for controlling the positioning of said regulator member and thereby regulating the quantity flow of pressurized fluid through said valve member and into said actuator cylinder.

8. A suspension and stabilizer system for vehicles which comprises a source of fluid under pressure greater than atmospheric, an actuator device mounted on said vehicle intermediate the wheels and frame of said vehicle and interconnected to said source for the introduction of pressurized fluid into said actuator in such manner that the resultant movement of said actuator will increase and decrease the distance between the wheels and frame of said vehicle, a cylinder and piston fluid type shock absorber unit on said vehicle likewise operatively mounted between the wheels and frame of said vehicle in such manner that shock loads between the wheels and frame cause relative movement between said shock absorber cylinder and piston and consequent increase in fluid pressure within said shock absorber at the end of said shock absorber cylinder toward which the shock absorber piston is moving, an actuator selector valve intermediate said source of pressurized fluid and said actuator for directing the pressurized fluid into and out of said actuator to increase and decrease the distance between the wheels and frame of said vehicle, means connected to said shock absorber sensitive to pressure increments within said shock absorber for controlling the flow directing positioning of said actuator selector valve, a stabilizer expansion member likewise mounted on said vehicle between the wheels and frame of said vehicle and interconnected to said fluid source for the introduction of pressurized fluid into said stabilizer expansion member, a stabilizer selector valve intermediate said source of pressurized fluid and said stabilizer expansion member for directing the pressurized fluid into and out of said expansion member to increase and decrease the distance between the wheels and frame of said vehicle, an acceleration sensitive stabilizer member mounted on said vehicle in such manner that gravitational and acceleration forces which normally would cause undesirable movements of the frame of said vehicle will cause said acceleration sensitive member to be energized, and means interconnecting said acceleration sensitive member and said stabilizer selector valve for controlling the flow directing positioning of said stabilizer selector valve whereby tendencies of the vehicle frame and body to dip, pitch and tip will be counteracted by the resultant movement of said stabilizer expansion member.

References Cited in the file of this patent

UNITED STATES PATENTS

| | | |
|---|---|---|
| 2,568,401 | Lynn et al. | Sept. 18, 1951 |
| 2,593,040 | Lloyd | Apr. 15, 1952 |
| 2,778,656 | May | Jan. 22, 1957 |